Feb. 7, 1956  C. A. FLEMING  2,733,466
COATING REMOVAL APPARATUS
Filed Feb. 18, 1952  2 Sheets-Sheet 1
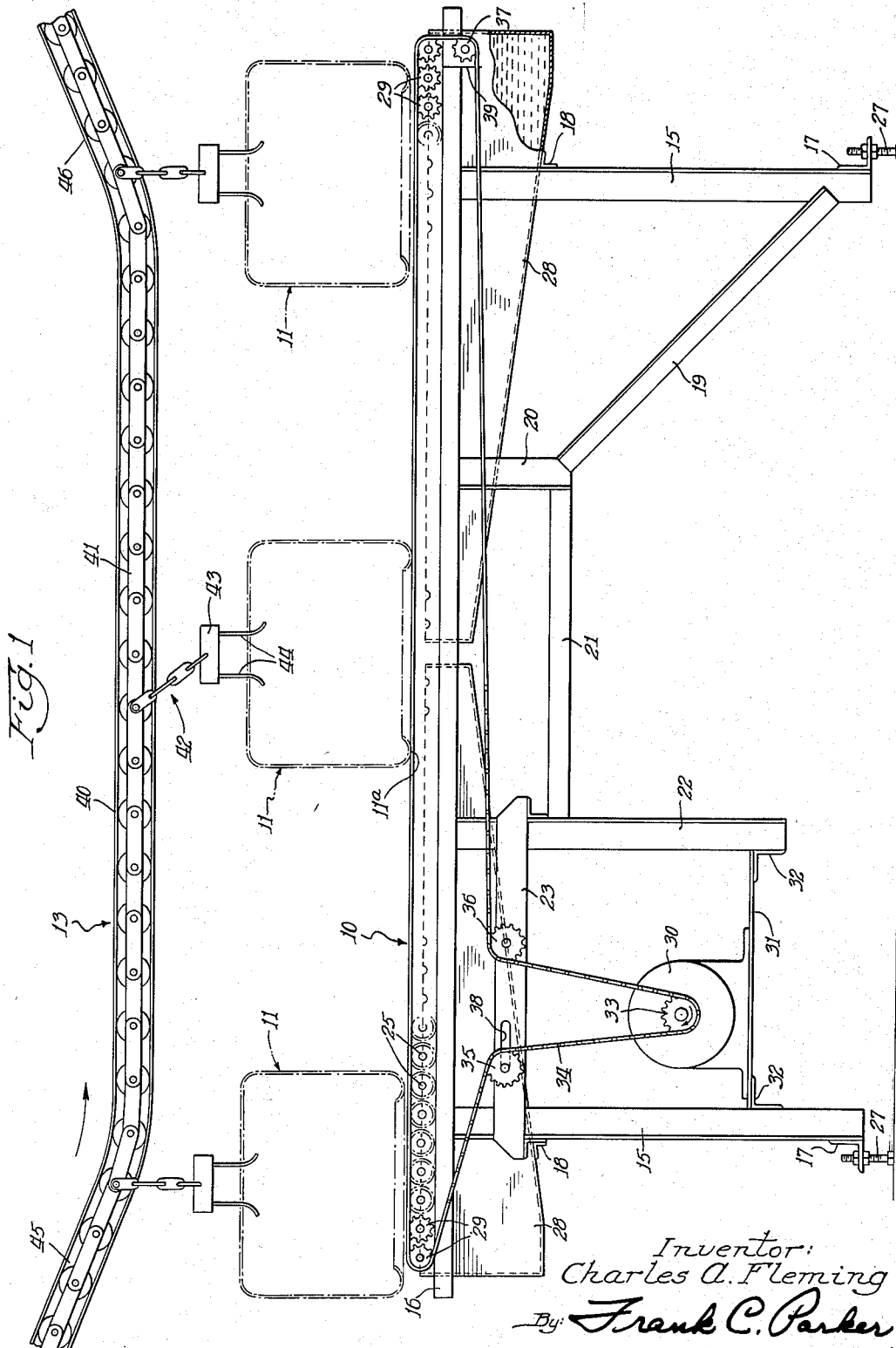
Inventor:
Charles A. Fleming
By: Frank C. Parker
Atty

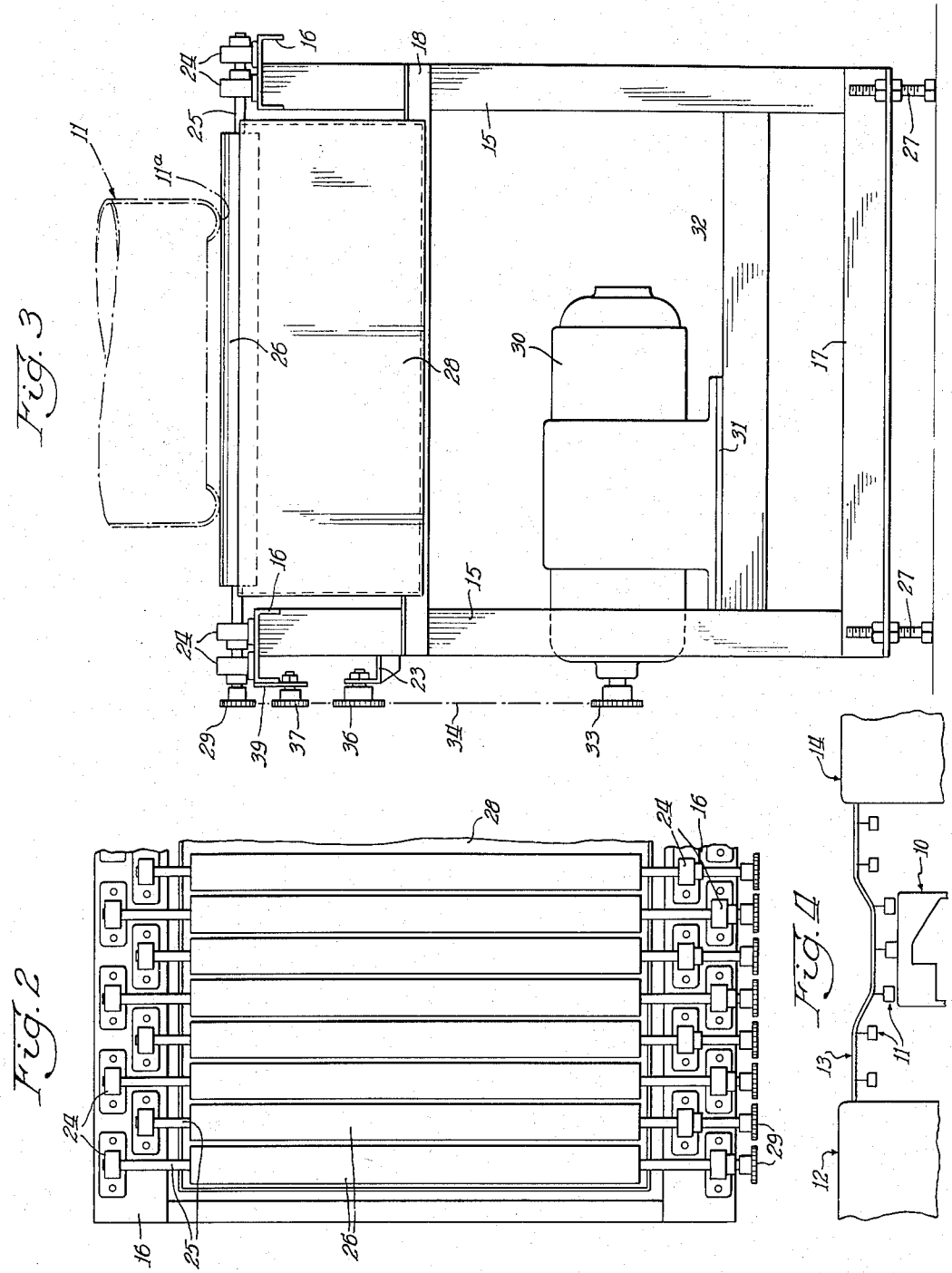

United States Patent Office 2,733,466
Patented Feb. 7, 1956

2,733,466

COATING REMOVAL APPARATUS

Charles A. Fleming, Park Forest, Ill., assignor to Borg-Warner Corporation, Chicago, Ill., a corporation of Illinois Application February 18, 1952, Serial No. 272,137

8 Claims. (Cl. 15—97)

The present invention relates in its broadest aspects to coating removal and, more particularly, the present invention relates to apparatus for removing a bead of a coating, such as paint or enamel, from objects, which bead is formed by the coating running down the sides of the objects after it is applied thereto and before it has dried.

The primary object of the present invention is therefore to provide a simple and economical apparatus or device for removing the bead of a coating which forms around the rim of an object due to the coating running down the sides of the object after the coating is applied thereto and before it has had a chance to dry.

Another object of the invention is to provide apparatus for removing a bead of a coating from a coated object whereby the bead is removed or wiped from the object chiefly by friction resulting from relative movement between the object and a relatively smooth surfaced member engaged with the object.

Another object of the invention is to provide apparatus for removing a bead of a coating from a coated object wherein the object is passed over a member having its surface wet with a solvent capable of dissolving the coating. In this connection the wet surface of the member reduces the viscosity of the bead and the coating comprising the bead flows onto and adheres to the member. Also, cohesion between the bead and the portions of the coating adhering to the member is effective to a limited extent to cause more of the coating comprising the bead to run onto the member.

The present invention is particularly applicable to the manufacture of washing machine tubs. It is well-known to utilize conveyors in manufacturing processes for transporting articles being manufactured between the various stations at which some work is performed on the articles. The present invention utilizes such a conveyor in a washing machine tub manufacturing line for advancing the tubs across the bead removing device after the tubs leave a painting or enameling room and before they are conveyed through a baking furnace. It has been found that after the washing machine tubs have the enamel or paint applied thereto, as by spraying or by dipping, for example, the enamel runs down the sides of the tubs and forms beads around the lower rims thereof. In order that the tubs will have a uniformly smooth enameled surface after the enamel is baked thereon, it is necessary to remove the beads in some way as the appearance of the completed tubs is otherwise marred. The present invention is therefore chiefly concerned with the provision of apparatus for removing these beads from washing machine tubs as they proceed from an enamel application station to an enamel drying station.

A more detailed object of the invention is therefore to provide a table disposed beneath the washing machine tubs as they are advanced from an enameling room to a baking furnace, the top of which table consists of suitable roller devices for engaging the lower rims of the tubs and thereby removing the beads of enamel formed thereon.

Another object of the invention is to provide a device for removing a bead of liquid enamel from a washing machine tub, which device comprises a table having a tub engaging surface consisting of a plurality of driven rollers which are partially immersed in a solvent which is capable of dissolving the enamel on the tubs. As the tubs advance across the table, successive portions of the rollers comprising the table top are brought into the solvent and the enamel deposited on the rollers is thereafter dissolved by the solvent as the rollers rotate therein.

Another object of the invention is to provide a device for removing the bead formed on objects having an enamel coating applied thereto which bead forms as a result of the coating running down the sides of the objects and collecting around the lower extremities of the objects to form the bead, wherein the device is entirely automatic in its operation. When the bead of enamel is removed from the rims of washing machine tubs by the present device the enamel on the tubs is dried and the tub rims are sprayed with a thin film of enamel. Thereafter the tubs are advanced into the baking furnace and a smooth and substantially uniform enamel finish is formed all over the tub.

The above and numerous other objects and advantages of the present invention will become apparent from the following detailed description when read in conjunction with the appended drawings showing one preferred embodiment of the invention, wherein:

Fig. 1 is a side elevational view showing the present invention;

Fig. 2 is a plan view of the bead-removing rollers;

Fig. 3 is an end view of the device; and

Fig. 4 is a schematic illustration showing the present invention when used in a washing machine tub manufacturing line.

With reference to the drawings, wherein like reference numerals in the different views identify identical parts, one embodiment of the invention is disclosed and comprises a table, indicated generally by reference numeral 10, for removing the bead of enamel which forms around the rim of washing machine tubs 11, which bead is formed by the enamel running down the sides of the tubs after it is applied thereto in an enamel applying room 12. After the tubs 11 are enameled in the enameling room 12, they are transported by a conveyor 13 across the table 10 and into a drying room 14.

The table 10 comprises four vertical legs 15, a pair of longitudinally extending beams 16 respectively secured to pairs of the legs 15, transversely extending braces 17 and 18 and a plurality of other braces 19—23. All of the legs, beams and braces are rigidly secured together to provide a rigid table construction.

Rigidly secured to the beams 16 are a plurality of bearings 24 for rotatably mounting driving shafts 25 which respectively carry rollers 26. The rollers 26 are disposed in a single plane and are substantially parallel with each other. Adjusting bolts 27 adjacent each of the legs 15 and secured to the braces 17 are provided for raising and lowering each corner of the table 10 in order to maintain the table in a substantially horizontal plane.

A pair of tanks 28 are disposed beneath the rollers 26, the sides of the tanks 28 extending sufficiently high relative to the rollers 26, so that when the tanks are filled with an enamel solvent the rollers 26 are partially immersed in the solvent. As is apparent, the bottoms of the tanks 28 are inclined and the tanks may be provided with any suitable type stopper to facilitate draining the solvent therefrom. In one application of the present invention, a water base enamel is utilized for enameling the washing machine tub 11 and accordingly the solvent contained in the tanks 28 is water. It is contemplated, however, that any other solvent could be contained in the tanks 28 as would be necessary when an enamel having other than a water base is used for enameling the tubs 11.

The rollers 26 are made of metal which is capable of being wet by the solvent contained in the tanks 28. Each of the roller driving shafts 25 is provided at one end thereof with a driving gear 29. A motor 30 for driving the rollers 26 is rigidly mounted on a plate 31 secured to a pair of cross frame members 32. The motor driving shaft has a pinion 33 secured thereto and a chain 34 drivingly connects the pinion 33 with the gears 29 on each of the roller shafts 25, the chain 34 extending over idler gears 35, 36 and 37. The idler gears 35 and 36 are rotatably secured to the brace 23, the idler gear 35 being adjustable in a slot 38 in the brace 23 in order to take up any slack in the chain 34. The idler gear 37 is rotatably mounted on a plate 39 secured to one of the beams 16. As is apparent, when the motor 30 operates so as to drive the gear 33 in a clockwise direction, all of the gears 29 are likewise driven in a clockwise direction to cause clockwise rotation of the rollers 26. For reasons which will become clear hereinafter the rollers 26 on approximately the left third of the table 10 (as viewed in Fig. 1) are preferably driven at a slightly greater rate of speed than the remainder of the rollers 26, and this may be accomplished by any convenient means, such as by merely providing more teeth on the gears 29 for driving the rollers which rotate at a slower speed than the remaining rollers. Thus in the embodiment of the invention disclosed herein, there may be one more tooth on the gears 29 for driving the rollers 26 comprising approximately the right two-thirds of the table 10 (as viewed in Fig. 1) than are on the gears 29 for driving the rollers 26 comprising approximately the left one-third of the table 10. As a result, the rollers 26 on the left end of the table 10 are driven slightly faster than the remaining rollers 26.

The conveyor 13 for transporting the washing machine tubs from the enameling room 12 to the drying room 14 comprises a track 40 and a chain 41 adapted to be moved along the track. Suitable means are provided for connecting the washing machine tubs 11 to the chain 41 so that they will be carried along as the chain 41 advances and this means may comprise a flexible linkage 42 connected with the chain 41 and secured to a suitable member 43 formed with a pair of arms 44 adapted to enter an opening formed in the tubs 11 in order to grasp the tubs. As is clearly shown in Fig. 4, the conveyor 13 normally carries the tubs 11 at a height which would prevent their engaging the table 10. In order to enable the tubs 11 to engage the table 10, the track 40 is formed with a pair of sloping sections 45 and 46 which allows that portion of the conveyor 13 which passes over the table 10 to be sufficiently low to permit the tubs 11 to engage the top of the rollers 26 comprising the table 10.

It is to be particularly understood that the driving mechanism for rotating the rollers 26 and the conveyor mechanism for advancing the tubs is more or less schematic and could assume any other desired specific form.

In the operation of the device disclosed herein, the conveyor 13 advances the tubs 11 from left to right (as viewed in Fig. 1) at a substantially uniform rate of speed. When the tubs 11, as they are being transported by the conveyor 13, reach the sloping section 45 of the track 40, they drop slightly and engage the rollers 26. Under these conditions the linkage 42 slackens slightly. The more rapidly rotating rollers 26 on approximately the left third of the table 10, when engaged by the tubs 11 tend to move the tubs more rapidly from left to right than the speed at which they are being carried by the conveyor 13 and this causes any slack in the linkage 42 to be taken up. The remaining rollers 26, comprising approximately the right two-thirds of the table 10, also rotate faster than the speed of the conveyor 13. Thus, beyond the point on the table 10 at which the slack is taken up in the linkage 42, there is relative movement between the tubs 11 and the rollers 26 and the resultant friction between the tubs 11 and rollers 26 has been found to be extremely effective in removing the bead of enamel which forms around the rim 11a of the tubs 11.

Besides the friction between the rollers 26 and the tub rims 11a, other things also aid in removing the bead of enamel from the tub rims 11a. First of all, the tops of the rollers 26 which extend above the level of the water in the tanks 28 are continuously wet due to the fact that the rollers are constantly rotating through the water contained in the tanks 28. Since the water is capable of wetting the rollers 26 there is a thin film of water all over these portions of the rollers and because the water is capable of dissolving the enamel applied to the tubs 11 the viscosity of the beads is reduced and the enamel flows into and adheres to the surfaces of the rollers. This is responsible, at least to a certain extent, for causing some of the enamel comprising the beads to be withdrawn from the tub rims 11a. Another factor helping to remove the beads from the tub rims 11a results from the cohesion between the enamel which adheres to the rollers 26 and the enamel in the beads. Because of this cohesion the enamel comprising the beads tends to run onto the rollers 26. Probably the most important factor which is effective in removing the beads from the tub rims 11a is the friction between the rollers 26 and the tub rims 11a resulting from the relative movement between the rollers and the tubs. The friction between the rollers 26 and the tub rim 11a is effective to pull the bead from the rim. Consequently, as a result of the friction between the rollers 26 and the tub rims 11a, the tendency for the enamel to adhere to the rollers and the tendency for the enamel to run onto the rollers, the beads of enamel on the rims 11a are stripped therefrom onto the rollers and as the rollers thereafter rotate in the water contained in the tanks 28, the enamel is dissolved therefrom.

When the enamel beads are removed from the tub rims by the present apparatus, the portion of the tub rims which contact the rollers 26 is almost completely stripped of enamel. Due to the viscosity reduction of the enamel, caused by the film of solvent on the rollers, the enamel thickness tapers from substantially zero at the point of contact of the tub rims with the rollers to full thickness a short distance upwardly. This taper is gradual and uniform and after the enamel dries a thin film of enamel may be sprayed on the tub rims so that a smooth layer of enamel is formed over the entire tub. Thereafter the tub is conveyed through a baking furnace.

It will be apparent to those skilled in the art that the present invention provides a simple and efficient apparatus for removing the bead of enamel which forms on the lower rim of washing machine tubs as a result of the enamel running down the sides of the tubs after they leave the enameling room. It is contemplated that numerous changes may be made, particularly in the apparatus disclosed herein, without departing from the principles or spirit of the invention.

What is claimed is:

1. A device for removing a bead from a coated object wherein the bead is formed of the coating applied to the object, said device comprising a table including a plurality of rollers disposed in substantially co-planar and parallel relation, a tank disposed beneath said rollers for containing a solvent capable of dissolving the coating applied to the object and capable of wetting the rollers, said rollers extending into said tank and being partially immersed in the solvent contained in said tank, and conveyor belt means for advancing the object across said table with the bead in frictional contact with said rollers whereby the bead is stripped off by the rollers and dissolved by the solvent in the tank.

2. A device for removing a bead from a coated object wherein the bead is formed of the coating applied to the object, said device including a roller, a tank disposed beneath said roller for containing a solvent capable of dissolving the coating applied to the object and capable of wetting the roller, said roller extending into said tank and being partially immersed in the solvent contained in said tank, and conveyor belt means for advancing the object across said roller so that the bead makes frictional contact therewith, whereby the bead is stripped off of the object by the roller and dissolved by the solvent in the tank.

3. A device for removing a bead from an enameled washing machine tub wherein the bead is formed of the enamel applied to the tub, said device including a roller, a tank disposed beneath said roller for containing a solvent capable of dissolving the enamel applied to the tub and capable of wetting the roller, said roller extending into said tank and being partially immersed in the solvent contained in said tank, and conveyor belt means for advancing the tub across said roller so that the bead makes frictional contact therewith, whereby the bead is stripped off of the tub by the roller and dissolved by the solvent in the tank.

4. A device for removing a bead from a coated object wherein the bead is formed of the coating applied to the object, said device comprising a table including a plurality of rollers disposed in substantially co-planar and parallel relation, a tank disposed beneath said rollers for containing a solvent capable of dissolving the coating applied to the object and capable of wetting the rollers, said rollers extending into said tank and being partially immersed in the solvent contained in said tank, a conveyor comprising a track which dips downwardly across said table and a chain movable along said track, the objects being connected to the chain by a flexible connection and the dip of the conveyor tracks being sufficient to permit the edges of the objects to engage the table as they are advanced by the conveyor, across said table with the bead in frictional contact with said rollers, and means for rotating said rollers to bring successive portions of the surfaces thereof into the solvent in said tank, whereby the bead is stripped off of the object by the rollers and dissolved by the solvent in the tank.

5. An arrangement for removing a bead of enamel from the rim of a washing machine tub where the bead is formed by the enamel running down the sides of the tub after the enamel is applied thereto and comprising a plurality of rollers disposed substantially horizontally and parallel to each other, a tank disposed beneath said rollers for containing an enamel solvent, the sides of said tank extending upwardly a sufficient distance relative to said rollers to enable the rollers to be partially immersed in the solvent contained in said tank, means for rotating said rollers to bring successive portions of the surfaces thereof into the solvent in the tank, and a conveyor comprising a track which dips downwardly across said rollers so that the rim having the bead of enamel thereon frictionally engages the rollers, whereby the bead is stripped from the rim by the rollers and dissolved by the solvent in said tank.

6. An arrangement for removing a bead of soluble enamel from the rim of a washing machine tub where the bead is formed by the enamel running down the sides of the tub after the enamel is applied thereto and comprising a plurality of rollers disposed substantially horizontally and parallel to each other, a conveyor comprising a track which dips downwardly across said rollers and a chain movable along said track, the tubs being connected to the chain by a flexible connection and the dip of the conveyor track being sufficient to permit the rims of the tubs to engage the rollers as they are advanced by the conveyor, the flexible connection being slack upon the initial engagement of the tubs with said rollers, a tank disposed beneath said rollers for containing a solvent, the sides of said tank extending upwardly a sufficient distance relative to said rollers to enable the rollers to be partially immersed in the water contained in said tank, means for rotating said rollers at different speeds to bring successive portions of the surfaces thereof into the solvent in the tank, the conveyor advancing said tub across the rollers so that the rim of the tub having the bead of enamel thereon frictionally engages the rollers, whereby the bead of liquid enamel on the rim of the tub runs onto the rollers and is thereafter dissolved in the solvent in said tank.

7. In an arrangement for removing a bead of liquid water soluble enamel which forms on the rims of washing machine tubs by the enamel running down the sides of the tubs while the tubs are being advanced by a conveyor from an enamel applying station to an enamel baking station, the combination of a substantially horizontal table comprising a plurality of rollers disposed substantially parallel to each other, a water tank mounted beneath said rollers with the rollers being partially immersed in the water contained in said tank, and means for rotating said rollers so as to continuously wet the portions of said rollers which extend above the surface of the water, a conveyor comprising a track which dips downwardly across said rollers, and the dip of the conveyor tracks being sufficient to permit the rims of the tubs to engage the rollers, the conveyor being adapted to convey the tubs across said table such that the rims of the tubs frictionally contact said rollers, whereby the enamel forming the beads is stripped from the tub rims by said rollers and is thereafter dissolved by the water in said tank.

8. In an arrangement for removing a bead of liquid water soluble enamel which forms on the rims of washing machine tubs by the enamel running down the sides of the tubs while the tubs are being advanced by a conveyor from an enamel applying station to an enamel baking station, the combination of a substantially horizontal table disposed beneath the conveyor and comprising a plurality of rollers disposed substantially parallel to each other, the conveyor comprising a track which dips downwardly across said table and a chain movable along said track, the tubs being connected to the chain by a flexible connection and the dip of the conveyor track being sufficient to permit the rims of the tubs to engage the table as they are advanced by the conveyor, the flexible connection being slack upon the initial engagement of the tubs with said table, means for driving a first group of said rollers at a speed substantially greater than the speed of the chain along the track to take up the slack in the flexible connection, means for driving the rest of said rollers at a speed only slightly greater than the speed of the chain for maintaining the flexible connection taut to create friction between the rollers and the tubs as the tubs traverse the table, and a water tank mounted beneath said rollers with the rollers being partially immersed in the water, whereby the enamel forming the bead on the rim of each of the tubs is stripped off by the rollers and is dissolved by the water in said tank.

References Cited in the file of this patent

UNITED STATES PATENTS

| | | |
|---|---|---|
| 1,629,038 | Leightlitner | May 17, 1927 |
| 1,749,822 | Lakeman | Mar. 11, 1930 |
| 1,898,005 | Diescher | Feb. 21, 1933 |
| 2,064,173 | McGohan | Dec. 15, 1936 |
| 2,159,046 | Paxton et al. | May 23, 1939 |
| 2,275,563 | Sharlow | Mar. 10, 1942 |
| 2,295,575 | Gladfelter | Sept. 15, 1942 |
| 2,359,568 | Logan | Oct. 3, 1944 |